US012693959B2

(12) United States Patent
Sharma et al.

(10) Patent No.: US 12,693,959 B2
(45) Date of Patent: Jul. 28, 2026

(54) NETWORK SPILLOVER DETECTION AND GLOBAL HOLDOUT CREATION USING GRAPH PARTITIONING

(71) Applicant: PayPal, Inc., San Jose, CA (US)

(72) Inventors: Nitin S. Sharma, San Francisco, CA (US); Sanae Amani Geshnigani, San Jose, CA (US); Pengshan Zhang, Shanghai (CN); Haoyang Jia, Shanghai (CN); Junshi Guo, Shanghai (CN)

(73) Assignee: PayPal, Inc., San Jose, CA (US)

( * ) Notice: Subject to any disclaimer, the term of this patent is extended or adjusted under 35 U.S.C. 154(b) by 403 days.

(21) Appl. No.: 18/392,293

(22) Filed: Dec. 21, 2023

(65) Prior Publication Data

US 2025/0208978 A1     Jun. 26, 2025

(51) Int. Cl.
*G06F 11/3604*         (2025.01)
(52) U.S. Cl.
CPC ................................. *G06F 11/3612* (2013.01)
(58) Field of Classification Search
CPC .................................................. G06F 11/3612
USPC ........................................................... 726/6
See application file for complete search history.

(56) References Cited

U.S. PATENT DOCUMENTS

| | | | | |
|---|---|---|---|---|
| 2014/0214834 A1* | 7/2014 | Ozonat | ............... | G06F 16/9024 |
| | | | | 707/748 |
| 2019/0121926 A1* | 4/2019 | Wang | ....................... | G06F 30/18 |
| 2020/0358663 A1* | 11/2020 | Saint-Jacques | ......... | H04L 51/52 |
| 2022/0405455 A1* | 12/2022 | Ghose | ..................... | G06F 18/29 |
| 2025/0321727 A1* | 10/2025 | Williams | ............ | G06F 11/3612 |

* cited by examiner

*Primary Examiner* — Moeen Khan
(74) *Attorney, Agent, or Firm* — Haynes and Boone, LLP

(57)         ABSTRACT

Methods and systems are presented for facilitating computer software feature experimentation by using one or more graph analyses to partition users into different experimentation groups. A graph is generated to represent users of a service provider and relationships among the users. When a request to perform a software feature experiment on the users of the service provider, the graph is analyzed to determine an estimated spillover effect. The graph is then coarsened across multiple levels using a label propagation technique based on one or more coarsening parameters. After the graph has been coarsened, the graph is partitioned into multiple partitions based on one or more partitioning parameters. The coarsening parameters and/or the partitioning parameters may be determined based on the estimated spillover effect. A subset of users is selected for performing the software feature experiment based on the partitioning of the coarsened graph.

20 Claims, 9 Drawing Sheets

NETWORK SPILLOVER DETECTION AND GLOBAL HOLDOUT CREATION USING GRAPH PARTITIONING

BACKGROUND

The present specification generally relates to computer frameworks, and more specifically, to providing a framework for facilitating computer software feature experimentation according to various embodiments of the disclosure.

RELATED ART

One of the benefits of using computer frameworks is using such frameworks to run and/or test software before providing the software to end user devices. In particular, software used to provide services to users (e.g., payment services, data access services, user interfaces for accessing and/or controlling various other modules and/or devices such as vehicles, home appliances, etc.) can be updated seamlessly and frequently. For example, as long as a device on which a computer software runs is connected to a network, updated programming code can be transmitted to the device for updating the computer software.

With the ease of pushing updates to different instances of the computer software running on different devices of users (e.g., desktop or mobile computers of users, appliances of different users, different vehicles, etc.), an organization may choose to experiment with certain candidate software features (e.g., potential new software features that the organization may wish to incorporate into the computer software, etc.). The experimentation of candidate software features may enable the organization to determine the potential impact of the candidate software features before incorporating the candidate software features into the next update of the computer software. For example, the organization may experiment with a candidate software feature and a subset of its users (also referred to as the "treatment group"). The organization may update only the instances of the computer software associated with users in the treatment group, without updating the instances of the computer software associated with users in another group (also referred to as the "control" group or the "holdout" group). By experimenting with the candidate software feature with users in the treatment group and observing differences in behavior between the different groups of users (i.e., the treatment group and the control group), the organization may "test" the candidate software feature and determine whether the candidate software feature provides the intended and/or desired effect (e.g., increasing engagement, reducing complaints or frictions in conducting transactions, etc.) before incorporating the candidate software feature into the next update of the computer software.

Feature experimentation can be an effective way to gauge the potential impact of a candidate software feature, but only when the users in the treatment group and the users in the holdout group are properly segregated from each other, such that a change of behavior in one group of users does not affect the behavior of users in another group. However, for certain types of services (e.g., electronic payment services, social media platforms, electronic communication services, etc.) where many users are connected with other users (e.g., users who have conducted transactions with other users of the organization, users who have online profiles that are linked to profiles of other users, etc.), the change of behavior in one user may affect the behavior of other connected users. For example, when the candidate software feature causes an increase in a positive behavior (e.g., an increase in engagement with the computer software, an increase of frequency and/or amount in transactions, etc.) of one user in the treatment group, it may inadvertently lead to an increase in the positive behavior of other users due to the connections with that one user. The way that one group of users affects the behavior of another group of users within a network of community is known as a spillover effect. As a consequence of the spillover effect, the results from the feature experimentation may be inaccurate and unreliable, which can lead to sub-optimal designs and/or configurations of a computer software. Thus, there is a need for a framework for conducting feature experimentation that minimizes the spillover effect.

Figure 1:
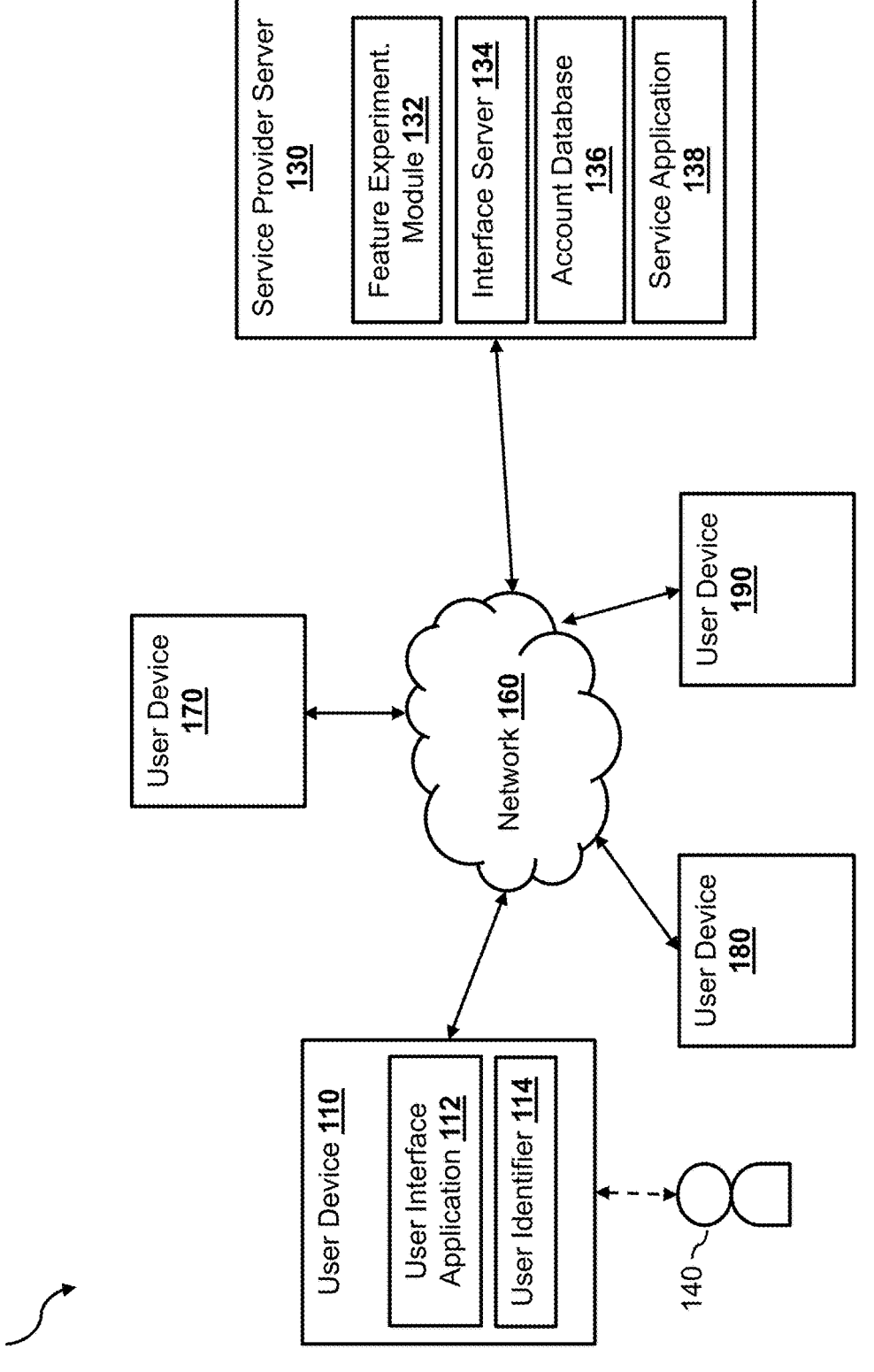
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for facilitating computer software feature experimentation by using one or more graph analyses to partition users into different experimentation groups. As discussed above, feature experimentation is a process through which an organization (e.g., a computer software provider, an organization that manages and/or maintains a computer software, etc.) can determine the efficacy (e.g., a potential impact) of candidate software features for computer software. A candidate software feature is a change in one or more software elements in computer software, which may be related to one or more aspects of the computer software. For example, the candidate software feature may be related to the core functionalities of the computer software (e.g., adding a new functionality, removing an existing functionality, changing an existing functionality, etc.), a user interface design of the computer software (e.g., modifying an attribute, such as a color or a size, of a visual element on the user interface, etc.), a user interface flow for performing a process (e.g., adjusting the number of screens and the order of the different screens for performing a process, such as conducting a payment, modifying a setting of a machine, etc.), and/or other aspects of the computer software.

By experimenting with a candidate software feature and a group of users (e.g., the treatment group), an organization may determine a potential impact of the candidate software feature (e.g., whether and how much the candidate software feature changes the behavior of its users). Based on the results from the feature experimentation, the organization may decide to incorporate the candidate software feature into the computer software, for example, by generating and transmitting updated programming code to devices running the computer software, and incorporating the updated programming code into the computer software running on the devices.

Feature experimentation typically involves adding a candidate software feature of computer software only to instances of the computer software that are running on devices associated with one group of users (e.g., the treatment group), but not to instances of the computer software that are running on devices associated with another group of users (e.g., the holdout group). A computer system of the organization may then observe any change of behavior associated with users in the treatment group and the users in the holdout group with respect to their interactions with the computer software. The computer system may determine that the candidate software feature has a positive effect if the computer system detects that the users in the treatment group exhibits a significantly larger amount (e.g., above a threshold value or percentage) of positive behavior (e.g., increased interactions or engagement with the software) than the users in the holdout group.

Consider an example in which an organization that provides and/or manages an electronic payment platform has designed a new user interface element (e.g., a new icon, a new position of an existing icon, etc.) for computer software that is used by users to access the electronic payment platform. The organization may wish to determine if the new user interface element (which becomes a candidate software feature for the computer software) has a positive effect on the usage of the electronic payment platform before fully incorporating the candidate software interface feature into the computer software. As such, the computer system of the organization may experiment with the candidate software feature and one group of users (e.g., the treatment group) by adding the candidate software feature to instances of the computer software associated with users in the treatment group, without adding the candidate software feature to instances of the computer software associated with users in another group (e.g., the holdout group). The users in the holdout group become the control group and are used to define the baseline behavior for the experiment with this feature.

The computer system may also determine a set of metrics for measuring the change of behavior in the users of the two groups. For example, the set of metrics may include a threshold increase of payment transactions, a threshold increase of payment amounts, a threshold increase of usage of the computer software, etc. The behavior of the users in the holdout group (e.g., the number of payment transactions conducted by users in the holdout group, the amount associated with the transactions, the usage of the computer software by the users in the holdout group, etc.) within a period of time may be used as the baseline behavior in this feature experiment, against which the behavior of the users in the treatment group can be compared. After modifying the instances of the computer software associated with users in the treatment group, the computer system may monitor the behavior of the users in the treatment group and the behavior of the users in the holdout group.

Specifically, the computer system may track the behavior of the users in the two groups or may compare the behavior of the users between the two groups. If the users in the treatment group exhibit a significantly larger amount of positive behavior (e.g., a significantly higher frequency and/or a significantly larger amount of transactions using the electronic payment platform, a higher frequency of interactions with the electronic payment platform, etc.) than the users in the holdout group, the computer system may determine that the new user interface feature has a positive impact. The computer system may then incorporate the candidate software feature into other instances of the computer software (e.g., the instances of the computer software associated with the holdout group or other users, etc.). On the other hand, if the users in the treatment group do not exhibit a significantly larger amount (or exceeding a threshold) of positive behavior than the users in the holdout group, the computer system may determine that the candidate software feature does not have a sufficient positive impact. The computer system may then withhold from incorporating the candidate software feature into the other instances of the computer software, and may remove the candidate software feature from the instances of the computer software associated with the users in the treatment group.

In order to perform feature experimentation for the candidate software feature, the computer system may first partition the users of the computer software into multiple groups. For example, the computer system may partition the users into a treatment group and a holdout group. The users in the treatment group and the users in the holdout group may be mutually exclusive from each other, and may or may not comprise the entire user population of users or potential users of the computer software. For example, the users in the holdout group may include only a portion of the entire user populations (e.g., 2%, 5%, etc.), and the users in the treatment group may also include a similarly small portion of the entire user populations (e.g., 2%, 5%, etc.).

As discussed herein, the way that the users are partitioned into different groups can be crucial in performing feature experimentation in order to reduce and/or eliminate spillover effects. For example, under one approach, users may be randomly selected to be part of the treatment group and the holdout group. However, as discussed herein, due to the connectedness of the users in the treatment group with users in the holdout group, a behavior change of the users in the treatment group may inadvertently cause a change of behavior in the users in the holdout group based on the connections between the users from the two groups. The way that users in one group can influence the behavior in another group is known as the spillover effect. When the feature experimentation exhibits a spillover effect that exceeds a threshold (e.g., when the behavioral change in the users of the treatment group affects the behavior of the users in the holdout group by the threshold, etc.), the results from the feature experimentation may be rendered sufficiently inaccurate and become unreliable for indicating an impact of the candidate software feature.

As such, according to various embodiments of the disclosure, a feature experimentation system may facilitate feature experimentation of a candidate software feature by using one or more graph analyses to partition users into different experimentation groups in order to reduce the spillover effect. In some embodiments, the feature experimentation system may generate (or otherwise access) a graph representing various users (or user accounts of the users). For example, the feature experimentation system may generate a node for each user account with the organization. The feature experimentation may also generate edges that connect pairs of nodes to represent relationships among the user accounts. The edges in the graph may indicate different types of relationships depending on the nature of the services provided by the computer software. For example, when the computer software provides electronic payment services, the edges may represent transactions conducted among the user accounts. In another example, when the computer software provides access to a social media platform, the edges may represent relationships (e.g., family, friends, co-workers, etc.) among the users. In some embodiments, each of the edges may include edge attributes that may be used to indicate a strength of the edge (e.g., a connectedness level, etc.) between the two nodes connected by the edge. For example, when the computer software provides peer-to-peer electronic payment services, the edges may represent transaction attributes (e.g., a number of transactions, amounts associated with the transactions, etc.) conducted between the corresponding user accounts, such that a stronger edge (e.g., a visually thicker edge, etc.) may indicate a larger number of transactions and/or a higher amount associated with the transactions conducted between users represented by two nodes and a weaker edge (e.g., a visually thinner edge, etc.) may indicate a smaller number of transactions and/or a lower amount associated with the transactions conducted between users represented by two nodes. In another example, when the computer software provides access to a social media platform, the edges may represent connection attributes (e.g., a frequency of interactions, a type of relationship, etc.) between the corresponding users.

Since the edges (e.g., a number of edges, a strength of the edges, etc.) between the nodes indicate a level of connectedness between the users represented by the nodes, a stronger edge between two nodes may indicate a stronger influence in behavior between the two corresponding users. For example, when a user represented by a node has increased interactions with the computer software, the interactions of the user may be related to other users connected to the user in the graph (e.g., transmitting payments to the connected users, increased interactions such as viewing/commenting on contents posted by connected users, etc.). Conversely, a weaker edge (or a lack of edges) between two nodes may indicate a weaker influence in behavior between the two corresponding users. As such, in some embodiments, the feature experimentation system may analyze the graph for assigning users into various experimentation groups (e.g., the treatment group, the holdout group, etc.) such that the connectedness (e.g., the number of edges, the strength of edges, etc.) between users from the different groups are minimized to reduce the spillover effect.

In some embodiments, the feature experimentation system may assign users into various experimentation groups by performing a process of multi-level coarsening of the graph and partitioning the graph. In some embodiments, the feature experimentation system may first coarsen the graph across multiple levels in an iterative manner. At each level of the coarsening process, the feature experimentation system may coarsen the graph by collapsing subsets of nodes into various clusters (also referred to as "communities"). In some embodiments, the feature experimentation system may use a label propagation technique to cluster the nodes. For example, the feature experimentation system may initially assign a unique label to each node in the graph. The feature experimentation system may begin propagating the labels through the nodes in the graph by iteratively updating the nodes in the graph. In some embodiments, the feature experimentation system may perform an update to every node's label in the graph in each iteration. To update the label of a node in the graph, the feature experimentation system may determine a particular label associated with the highest number of neighboring nodes (or the neighboring node(s) having the strongest edges with the node), and may update the label of the node using the particular label. If the particular label is the same as the existing label of the node, no changes are made for that node (and the node is considered updated). The nodes that are assigned to the same label form a distinct community within the graph.

The feature experimentation system may iteratively perform this label propagation step until a termination event has occurred. In each iteration, the feature experimentation system may examine each node in the graph, and determine whether the exiting label of the node requires to be updated by examining the labels of the neighboring nodes. The termination event may be associated with a condition that the nodes have converged, that is, no label updating has occurred in a single iteration. In another example, the termination event may be associated with a pre-defined number of iterations determined by the feature experimentation system.

In some embodiments, the feature experimentation system may apply one or more constraints during each label propagation step. For example, the constraints may include a size limit for each community. Thus, when the number of nodes that have been assigned to a particular label has reached the size limit, the feature experimentation system may freeze the nodes and the community, such that the nodes and the community will not participate in the subsequent iterations of label propagations. The constraints may also include a limit to a number of a particular type of users (e.g., first-time users, etc.) in each community. Thus, when the number of nodes corresponding to that particular type of users that have been assigned to a particular label has reached the number limit, the feature experimentation system may freeze the nodes in the corresponding community, such that the nodes and the community will not participate in the subsequent iterations of label propagations.

The feature experimentation system may stop iterating the label propagation step upon detection of a termination event. When the iterations of label propagation are completed, the feature experimentation system may transform the graph by combining nodes that are within the same community (e.g., assigned to the same label) into a single node. The edges between nodes within the same community would be removed, and the edges between nodes from two different communities will be retained and/or combined. The transformed graph is referred to a coarsened graph as the graph is now in a smaller scale (e.g., a smaller number of nodes and edges) than the original graph. The transformation of the graph completes an iteration (e.g., a first level) of the coarsening process.

In some embodiments, the feature experimentation system may repeat the coarsening process (e.g., performing the coarsening process at different levels) on the transformed graph. For example, the feature experimentation system may again assign unique labels to each node in the transformed graph, and may perform iterations of the label propagation step to propagate the labels in the nodes such that distinct communities can be formed based on the one or more constraints. Upon the occurrence of a termination event, the feature experimentation system may again transform the graph by collapsing the nodes (e.g., combining the nodes that are within the same community into a single node). In some embodiments, the feature experimentation system may continue to coarsen the graph until a threshold is met (e.g., the number of nodes in the transformed graph is below the threshold number, such as 10 million nodes, 1 million nodes, etc.). The feature experimentation system may then perform partitioning based on the coarsened graph.

As analyzing (and partitioning) a large graph can be a computationally complex task (e.g., consume a large amount of computation resources such as processing power and memory, etc.), the multi-level coarsening process performed on the graph is beneficial since it significantly reduces the complexity of the graph before the partitioning process. The multi-level coarsening process produces a transformed graph that is sufficiently small (e.g., sufficiently simple) such that the partitioning process can be performed by the feature experimentation system (e.g., a computer system) more efficiently.

In some embodiments, the feature experimentation system may partition the coarsened graph based on a size threshold determined for a particular group of users for the feature experimentation. For example, if it is determined that the holdout group for the feature experimentation comprises 2% of the entire user population, the feature experimentation system may perform a 50-way partition on the coarsened graph, such that each partition may include nodes that represent approximately 2% (e.g., within a threshold deviation from 2%) of the entire user population.

In some embodiments, in addition to the size constraint, the feature experimentation system may partition the coarsened graph based on one or more constraints. The constraints may be associated with a distribution of a particular type of user (e.g., users with a particular user attribute, such as first-time users, users of a certain age group, users with a certain tenure with the organization, average transaction frequency, uses with a certain conversion rate, etc.), such that the users in each partition are not different from each other by a threshold. In some embodiments, the feature experimentation system may use a graph partitioning algorithm (e.g., METIS, Quicksort, etc.) to partition the coarsened graph based on the constraints.

Based on the one or more constraints, the partitions of the coarsened graph should be substantially balanced. That is, the user distribution among the partitions should not deviate by more than a threshold. The feature experimentation system may then project the partitioned coarsened nodes back to the nodes in the original graph, such that each partition encompasses a subset of nodes in the original graph. In some embodiments, the feature experimentation system may select one of the partitions, and assign the users (or user accounts) represented by the nodes in the selected partition to a particular group (e.g., the holdout group). The feature experimentation system may not subject the users (or user accounts) in the holdout group to any future experiments, such that the users in the holdout group can be the control group for subsequent experiments. In some embodiments, the feature experimentation system may also select another partition, and assign the users (or user accounts) represented by the nodes in the partition to a treatment group for the feature experimentation.

The feature experimentation system may then perform the feature experiment with the users assigned to the treatment group. For example, the feature experimentation system may transmit updated programming code only to the instances of the computer software associated with the users in the treatment group. The updated programming code, when executed by the devices, may update the computer software to incorporate the candidate software feature (e.g., by modifying a user interface element, by adding/modifying/removing a functionality, etc.). The feature experimentation system may then track behavior of the users in the treatment group and the users in the holdout group for a period of time (e.g., 4 weeks, 6 months, etc.) after the initiation of the feature experiment. The feature experimentation system may compare the behavior of the users in the treatment group and the behavior of the users in the holdout group within the period of time, and may determine whether and an extent to which the candidate software feature induces an increase of positive behavior from the users. Based on the results of the feature experiment, the organization may determine whether to incorporate the candidate software feature into the computer software, for example, via a next software update of the computer software.

In some embodiments, prior to partitioning the graph for the feature experiment, the feature experimentation system may first estimate a spillover effect for the feature experiment if the users are not partitioned properly (such that the users in the holdout group are not sufficiently isolated from the users in the treatment group). For example, a Horowitz-Thompson estimator may be used to estimate the spillover effect based on the connectedness of the nodes in the graph. In some embodiments, the feature experimentation system may use the spillover estimate to determine the parameters in the graph partitioning process (e.g., the number of iterations for performing the label propagation step, the number of iterations for performing the coarsening process, the allowed deviation associated with the one or more constraints while performing the coarsening process and/or the partitioning process, etc.). For example, when a high level of spillover effect is estimated, the feature experimentation system may determine to perform more iterations of the label propagation step and/or the coarsening process, and/or a smaller allowed deviation associated with the one or more constraints corresponding to the coarsening process and/or the partitioning process.

In some embodiments, in order for the computer system to analyze the graph for performing the coarsening and/or the partitioning process, the computer system may adopt a distributed process using multiple worker modules to process different parts of the graph in parallel, in order to enhance the efficiency of analyzing the graph. For example, the computer system may generate multiple worker modules (each a computer software program that is configured to analyze a portion of a graph in an identical manner). The computer system may access graph data associated with a graph that represents the users of the service provider and the relationships among the users. The graph data may include multiple edge data objects. Each edge data object includes edge data (e.g., relationship data such as transaction data, etc.) between two nodes in the graph. Each edge data object may also designate one of the connecting nodes as a source node (e.g., the node that represents a payor in a transaction) and the other node as a target node (e.g., the node that represents a payee in the transaction).

The computer system may assign a different subset of the nodes to each of the worker module. Each of the worker modules may access the edge data objects and process the edge data objects. When processing an edge data object, the worker module may first determine whether the source node and the target node associated with the edge data object are within the subset of nodes assigned to the worker module. If both the source node and the target node are assigned to the worker module, the worker module may analyze the edge, generate edge attributes, and store the edge attributes of the edge data object in an edge data file.

If only the target node, and not the source node, is assigned to the worker module, the worker module may attach a global node identifier associated with the target node (generated by the worker module) to the edge data object, and send the modified edge data object to another worker module to which the source node has been assigned. If only the source node, and not the target node, is assigned to the worker module, the worker module may send the edge data object to another worker module to which the target node has been assigned. The other worker module may modify the edge data object by incorporating a global node identifier of the target node into the edge data object, and send the modified edge data object back to the worker module. The worker module may then process the modified edge data object by generating edge attributes and store the edge attributes in the edge data file. The computer system may then use the edge attributes generated by the worker modules and stored in the edge data file to further process the graph.

FIG. 1 illustrates an electronic transaction system 100, within which the feature experimentation system may be implemented according to one embodiment of the disclosure. The electronic transaction system 100 includes a service provider server 130 that is associated with the online service provider and user devices 110, 170, 180, and 190 that may be communicatively coupled with each other via a network 160. The network 160 may be implemented as a single network or a combination of multiple networks. For example, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110 may be utilized by a user 140 to interact with the service provider server 130 and/or other user devices 170, 180, and 190 over the network 160. For example, the user 140 may use the user device 110 to log in to a user account to access account services or conduct electronic transactions (e.g., data access, account transfers, electronic payment transactions, posting content and reacting to content, onboarding transactions, etc.) with the service provider server 130. The user device 110 may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one example, includes a user interface (UI) application 112 (e.g., a web browser, a mobile payment application, etc.), which may be utilized by the user 140 to interact with the service provider server 130 over the network 160. In one implementation, the user interface application 112 includes a software program (e.g., a mobile application) that provides a graphical user interface (GUI) for the user 140 to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160. Thus, the user 140 may use the user interface application 112 to initiate electronic transactions with the service provider server 130.

The user device 110 may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile).

Each of the user devices 170, 180, and 190 may include similar hardware and software components as the user device 110, such that each of the user devices 170, 180, and 190 may be operated by a corresponding user to interact with the service provider server 130 in a similar manner as the user device 110.

The service provider server 130 may be maintained by a transaction processing entity or an online service provider, which may provide processing of electronic transactions between users (e.g., the user 140 and users of other user devices, etc.) and/or between users and one or more merchants. As such, the service provider server 130 may include a service application 138, which may be adapted to interact with the user device 110 and/or the user devices 170, 180, and 190 over the network 160 to facilitate the electronic transactions (e.g., electronic payment transactions, data access transactions, content postings, etc.) among users and merchants processed by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities. In another example, the service provider server 130 may be provided by any entity posting or publishing content on a platform, app, or website, such as a social networking site, a professional networking site, a content sharing site, a review site, and the like.

The service application 138 may include a payment processing application (not shown) for processing purchases and/or payments for electronic transactions (including publishing of content) between a user and a merchant or between any two entities (e.g., between two users, between two merchants, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140, users of the user devices 170, 180, and 190, etc.) may access a user account associated with the user and access various services offered by the service provider server 130, by generating HTTP requests directed at the service provider server 130.

The service provider server 130 may be configured to maintain one or more user accounts in an account database 136, each of which may be associated with a profile and may include account information associated with one or more individual users (e.g., the user 140 associated with user device 110, users of the user devices 170, 180, and 190, etc.) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. Account information may also include user purchase profile information such as account funding options and payment options associated with the user, payment information, receipts, and other information collected in response to completed funding and/or payment transactions.

In one implementation, a user may have identity attributes stored with (such as accounts database 136) or accessible by the service provider server 130, and the user may have credentials to authenticate or verify identity with the service provider server 130. User attributes may include personal information, including photos, date of birth, social security number, home address, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

The service provider server 130 may also include a feature experimentation module 132 that implements the feature experimentation system as discussed herein. In some embodiments, the feature experimentation module 132 may be configured to facilitate an experiment of one or more candidate software features for the service provider server. As discussed herein, the service provider server 130 may host and/or maintain computer software (e.g., the user interface application 112, a website hosted by the service provider server 130, etc.) that may be used by user devices (e.g., the user devices 110, 170, 180, and 190) to enable the user devices 110, 170, 180, and 190 to access services offered by the service provider server 130. The service provider server 130 may update the computer software in order to improve the computer software (e.g., improving the performance, improving the functionalities, improving the user interface workflow, improving the look and feel, etc.). The update to the computer software may include incorporating a new software feature into the computer software. The new software feature may be related to the core functionalities of the computer software (e.g., adding a new functionality, removing an existing functionality, changing an existing functionality, etc.), a user interface design of the computer software (e.g., modifying an attribute, such as a color or a size, of a visual element on the user interface, etc.), a user interface flow for performing a process (e.g., adjusting the number of screens and the order of the different screens for performing a process, such as conducting a payment, access an account balance, etc.), and/or other aspects of the computer software. However, while it is easy to determine that certain features (e.g., shorten the user interface flow for performing a function, etc.) are likely to be an improvement to the computer software and may induce an increase of positive behavior from the users, it may not be as obvious to determine that certain other features (e.g., modifying a size or a color of an icon on the user interface, etc.) would provide improvement to the computer software. As such, the service provider server 130 may request the feature experimentation module 132 to perform a feature experiment on a candidate new feature, and may determine whether to incorporate the candidate new feature into the computer software based on the results of the feature experimentation.

Figure 2:
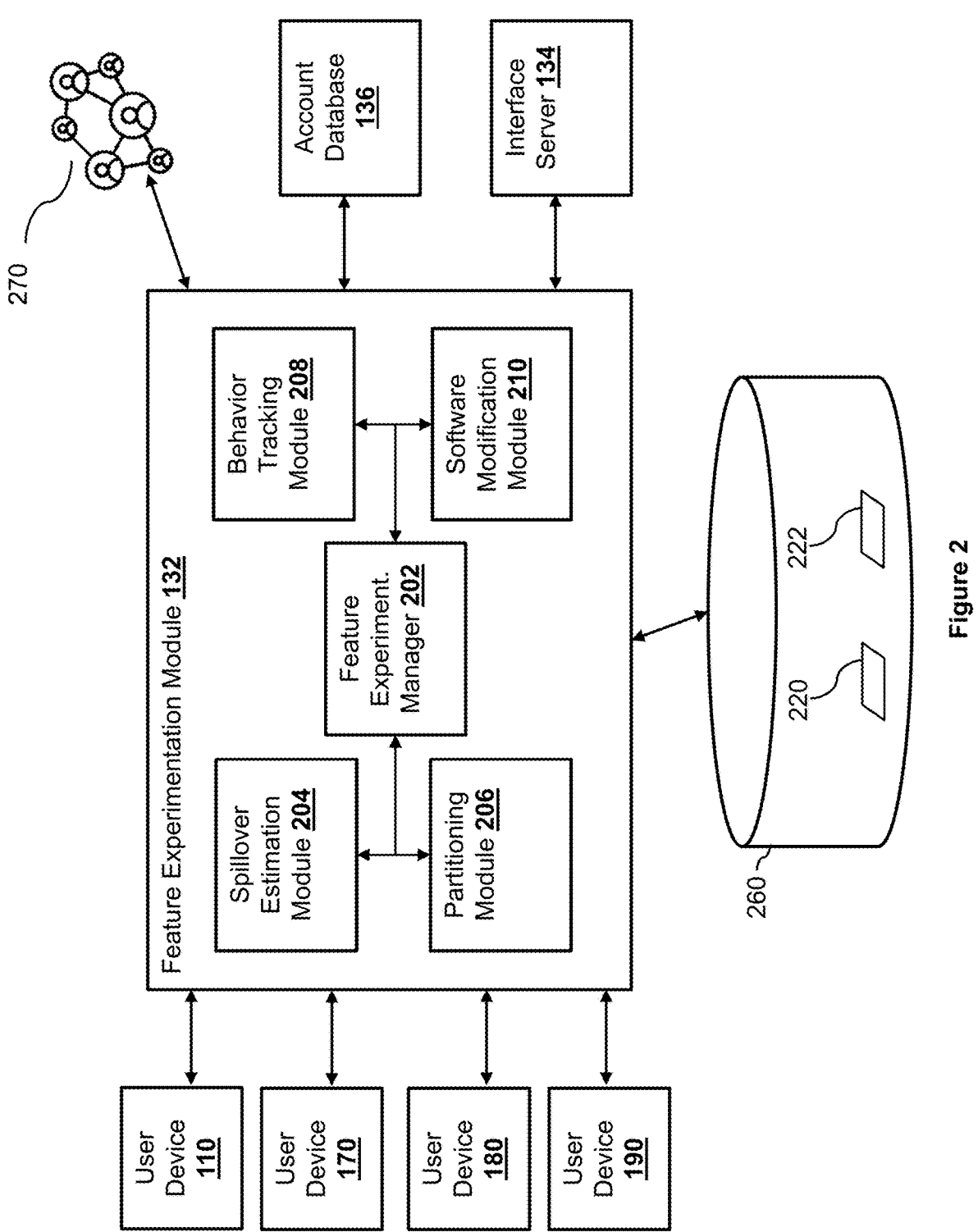
FIG. 2 is a block diagram illustrating a feature experimentation module according to an embodiment of the present disclosure.

FIG. 2 is a block diagram illustrating the feature experimentation module 132 according to various embodiments of the disclosure. As shown, the feature experimentation module 132 includes a feature experimentation manager 202, a spillover estimation module 204, a partitioning module 206, a behavior tracking module 208, and a software modification module 210. The feature experimentation module 132 may receive a request to perform a feature experiment for a candidate software feature.

In some embodiments, the feature experiment manager 202 may first use the spillover estimation module 204 to determine an estimated spillover effect for performing such a software feature experiment when the treatment group and/or the holdout group of users are not adequately selected. For example, the spillover estimation module 204 may randomly select a subset of the users of the service provider server 130 for the treatment group, and may also randomly select another subset of the users of the service provider server 130 for the holdout group. In other embodiments, the spillover estimation module 204 may select the subset of users for the treatment group and/or the holdout group based on the software feature being experimented with or considered for incorporation into the software, e.g., a software feature directed to children, such as video games, may have different treatment and holdout groups than a software feature directed to adults, such as adult content. In other words, the groups may be selected based on expected users of the software in which the software feature is being considered for incorporation. Thus, even with a more directed initial selection (as compared to random selection), the process described herein can further refine selection of user groups for the experimentation to achieve the benefits described herein. The spillover estimation module 204 may then estimate a spillover effect of the feature experiment if the experiment were conducted using the randomly selected treatment group and holdout group. In some embodiments, the spillover estimation module 240 may estimate the spillover effect based on the connectedness between the users in the treatment group and the users in the holdout group. For example, the spillover estimation module 204 may examine the users selected to be in the holdout group, and determine a level of connectedness (e.g., a number of connections) between that user in the holdout group and any user in the treatment group. The spillover estimation module 204 may generate a spillover index (e.g., a value between 0 and 10 where 10 represents a highest spillover effect and 0 represents a lowest spillover effect) based on the analysis (e.g., using a Horowitz-Thompson estimator, etc.). The spillover index may be used by the partitioning module 206 in determining parameters used for performing the coarsening and/or the partitioning of a graph representing the users.

The feature experiment manager 202 may also generate (or otherwise access) a graph 270 that represents the users (or user accounts) of the service provider server 130. For example, the graph 270 may be generated using user account data that is stored in the account database 136. The graph 270 may include nodes that represent the corresponding users (or user accounts) of the service provider server 130. The graph 270 may also include edges that represent the connections among the users (or the user accounts). For example, when the computer software provides electronic payment services, the edges may represent transactions conducted among different user accounts. In another example, when the computer software provides access to a social media platform, the edges may represent relationships (e.g., family, friends, co-workers, etc.) among the users. In some embodiments, each of the edges may include edge attributes that may be used to indicate a strength of the edge (e.g., a connectedness level, etc.) between the two nodes connected by the edge. For example, when the computer software provides electronic payment services, the edges may represent transaction attributes (e.g., a number of transactions, amounts associated with the transactions, etc.) conducted between the corresponding user accounts. In another example, when the computer software provides access to a social media platform, the edges may represent connection attributes (e.g., a frequency of interactions, a type of relationship, etc.) between the corresponding users.

In some embodiments, the partitioning module 206 may analyze the graph and partition the graph into different groups for the feature experiment using the techniques disclosed herein with a goal of minimizing the connections between the treatment group and the holdout group. Once the graph 170 is partitioned, the feature experimentation manager 202 may assign users in the treatment group 220 and users in the holdout group 222 based on the partitions. The feature experimentation manager 202 may then use the software modification module 210 to implement the candidate software feature on instances of the computer software associated with users in the treatment group 220. For example, if the user 140 of the user device 110 and the user of the user device 170 are selected to be in the treatment group 220, but not the users of the user devices 180 and 190, the software modification module 210 may modify the user interface application 112 of the user device 110 and the user interface application of the user device 170 (e.g., by transmitting updated programming code to the user devices 110 and 170 to update the corresponding user interface applications, etc.), but may not modify the applications of the user devices 180 and 190. Alternatively, the software modification module 210 may configure the website of the service provider server 130 such that a different interface and/or functionality may be presented when the user 140 of the user device 110 or the user of the user device 170 accesses the website, but not for the users of the user devices 180 and 190.

After initiating the feature experiment, the behavior tracking module 208 may monitor the behavior of the users with respect to the computer software. For example, the behavior tracking module 208 may communicate with the interface server 134 and log activities of the users with the corresponding computer software for a period of time (e.g., 3 months, 6 weeks after the initiation of the feature experiment, etc.). The feature experimentation manager 202 may compare the behavior of the users in the treatment group and the users in the holdout group, and may determine an impact level of the candidate software feature based on the comparison. The feature experimentation manager 202 may determine to incorporate the candidate software feature into the computer software if the impact level exceeds a threshold. For example, the feature experimentation manager 202 may use the software modification module 210 to generate updated programming code corresponding to the candidate software feature to be incorporated into the next software update package for the computer software. In another example, the feature experiment manager 202 may use the software modification module 210 to update the website hosted by the interface server 134.

Figure 3:
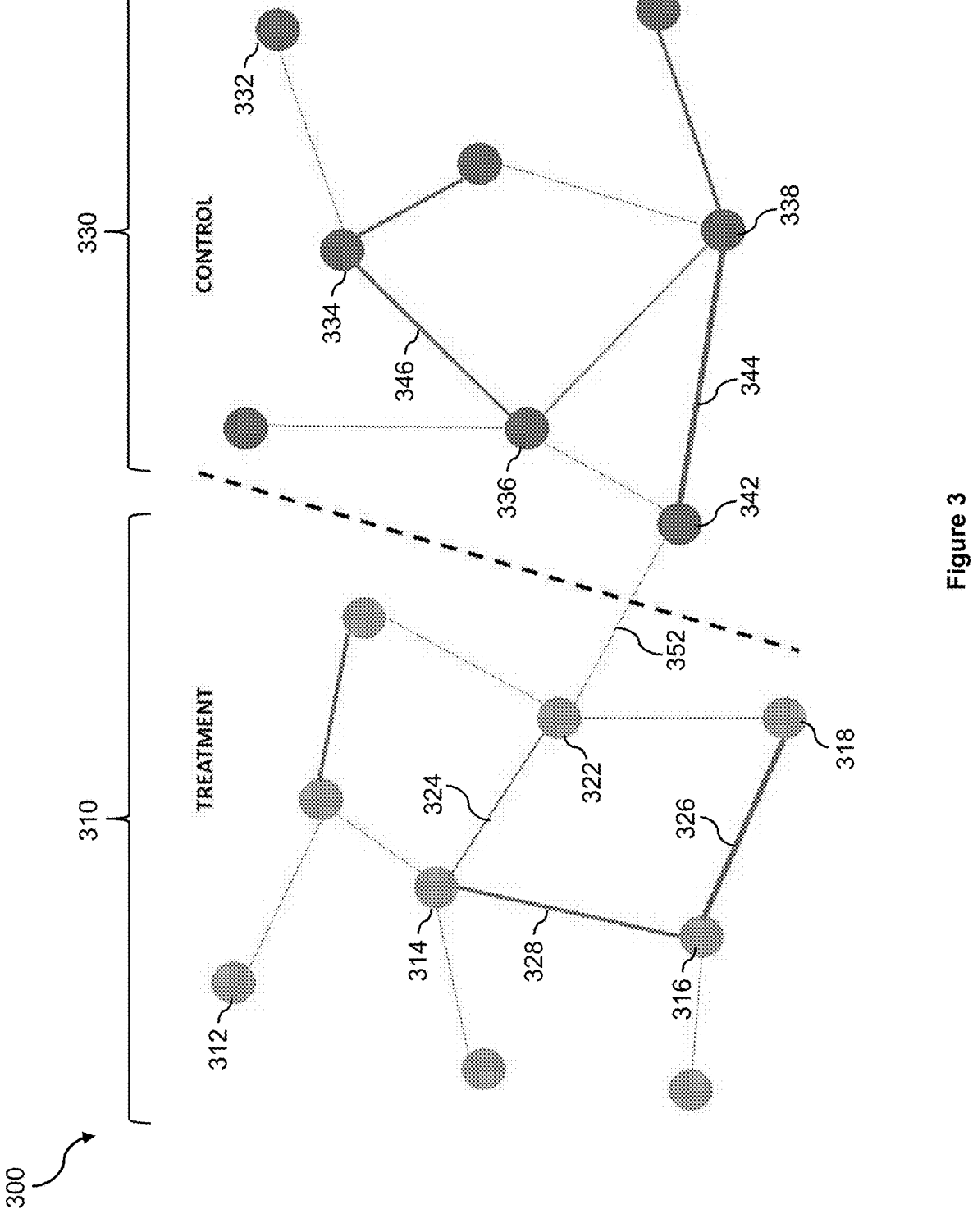
FIG. 3 illustrates an example graph that is partitioned into a treatment group and a control group according to an embodiment of the present disclosure.

FIG. 3 illustrates a sub-graph 300 according to various embodiments of the disclosure. The sub-graph 300 may correspond to a portion of the graph 270 that represents the users of the service provider server 130. As shown, the sub-graph includes nodes, such as nodes 312, 314, 316, 318, 322, 332, 334, 336, 338, and 342, that represent various users (or user accounts) of the service provider server 130. The nodes are also connected via various edges. For example, the nodes 314 and 322 are connected via an edge 324, the nodes 314 and 316 are connected via an edge 328, the nodes 316 and 318 are connected via an edge 326, the nodes 322 and 342 are connected via an edge 352, the nodes 334 and 336 are connected via an edge 346, and the nodes 338 and 342 are connected via an edge 344. As shown, each of the edges may include edge attributes that may be illustrated by a thickness of the edge. For example, a thicker edge may represent a higher frequency (or a larger number) of transactions and/or larger amounts in the transactions, etc. In this example, the edge 326 being thicker than the edge 324 may indicate that more transactions (or a higher frequency of transactions) have been conducted between user accounts represented by the nodes 316 and 318 than the user accounts represented by the nodes 314 and 322, and/or that the amounts of the transactions are higher between user accounts represented by the nodes 316 and 318 than the user accounts represented by the nodes 314 and 322.

In this example, the nodes of the sub-graph 300 have been partitioned into two groups: a treatment group 310 and a control group 330 for a feature experiment. Based on this partition, a candidate software feature may be provided to users represented by the nodes in the treatment group 310, but not to users represented by the nodes in the control group 330. However, due to the connection (e.g., the edge 352) between the node 322 in the treatment group 310 and the node 342 in the control group 330, the user behavior of the user represented by the node 322 may influence the user behavior of the user represented by the node 342, which may affect the results from the feature experiment (e.g., rendering it inaccurate and unreliable for the purpose of determining an impact of the software feature). As such, in some embodiments, the partitioning module 206 may be configured to use the techniques disclosed herein to partition the graph 270 into different groups for a feature experiment such that the connections between the treatment group and the control group (e.g., the edge 352) are minimized.

In some embodiments, the partitioning module 206 may assign users of the service provider server 130 into various experimentation groups (e.g., the treatment group, the hold-out group, the control group, etc.) with a goal of minimizing the connections between the users from the different groups (e.g., the edge 352 in the sub-graph 300). Based on the number of users that use services offered by the service provider server 130 and the number of transactions conducted by the users, the size of the graph 270 can be quite large. For example, an online payment provider may have over 500 million users, which translates to over 500 million nodes in the graph 270. If an average user of the online payment provider conducts transactions with 10 other users, the graph 270 may include 5 billion edges connecting the various nodes. Analyzing such a graph 270 at this scale may be an overly complex problem for a computer system to solve as it will use a large amount of computer resources (e.g., computer processing power, computer memory, etc.). It may take a computer system a long time to partition such a graph or may not even be able to perform the partitioning at all (e.g., running out of computer memory, etc.). As such, the partitioning module 206 may perform a process of multi-level coarsening of the graph 270 before partitioning the graph 270. The multi-level coarsening of the graph 270 performed by the partitioning module 206 provides a technical improvement for a computer system in analyzing and partitioning a graph, as it substantially reduces the complexity of the graph 270 before performing the partitioning step. In some embodiments, the partitioning module 206 may first coarsen the graph 270 across multiple levels in an iterative manner. At each level of the coarsening process, the partitioning module 206 may coarsen the graph 270 by collapsing subsets of nodes into various clusters (also referred to as "communities").

In some embodiments, the partitioning module 206 may use a label propagation technique to cluster the nodes. For example, the partitioning module 206 may initially assign a unique label to each node in the graph 270. The partitioning module 206 may begin propagating the labels through the nodes in the graph 270 by iteratively updating the nodes in the graph 270. In some embodiments, the feature experimentation system may perform an update to every node's label in the graph 270 in each iteration. To update the label of a node in the graph 270, the partitioning module 206 may determine a particular label associated with the highest number of neighboring nodes (or the neighboring node(s) having the strongest edges with the node), and may update the label of the node using the particular label. If the particular label is the same as the existing label of the node, no changes are made for that node (and the node is considered updated). The nodes that are assigned to the same label form a distinct community within the graph 270.

Figure 4:
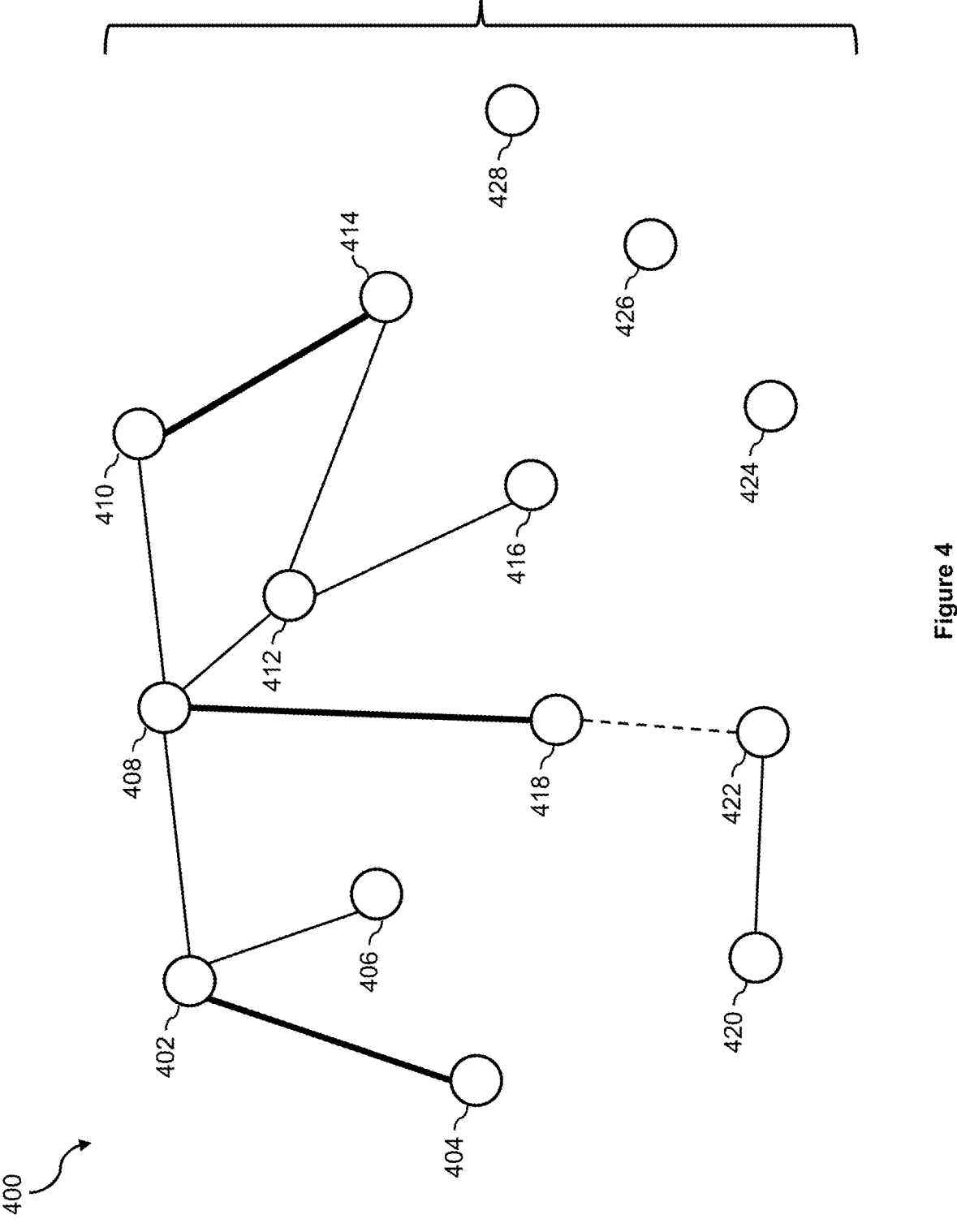
FIG. 4 illustrates an example graph representing users of a service provider and relationships among the users according to an embodiment of the present disclosure.

FIG. 4 illustrates an example graph 400 according to various embodiments of the disclosure. The graph 400 may be a portion of, or a simplified version of the graph 270, and will be used for the purpose of illustrating the techniques of coarsening and partitioning a graph. The graph 400 includes nodes 402, 404, 406, 408, 410, 412, 414, 416, 418, 420, 422, 424, 426, and 428. As shown, the nodes 402, 404, 406, 408, 410, 412, 414, 416, and 418 are connected to each other by various edges based on transactions conducted between user accounts represented by the nodes 402, 404, 406, 408, 410, 412, 414, 416, and 418, and the nodes 420 and 422 are connected to each other based on transactions conducted between user accounts represented by the nodes 420 and 422. As shown, the nodes 418 and 422 are connected to each other by a different type of edge (indicated as dotted line instead of a solid line), which may represent a different type of relationship between the accounts represented by the nodes 418 and 422. For example, the user accounts represented by the nodes 418 and 422 may not have conducted any transactions with each other. However, the feature experimentation module 132 may detect that the user accounts represented by the nodes 418 and 422 are on each other's contact list, which may indicate that the users know each other. In some embodiments, the feature experimentation module 132 may still connect the nodes 418 and 422, but use a different type of edges (which may indicate a weaker connection than the other type of edges) because the users may still influence the behavior of each other based on their relationship with each other despite not having any transactions conducted between them in the past.

Each of the nodes 424, 426, and 428 are standalone nodes since none of the user accounts represented by the nodes 424, 426, and 428 has conducted transactions with any other user accounts with the service provider server 130. In some embodiments, the partitioning module 206 may ignore the standalone nodes because the user accounts represented by these standalone nodes may be inactive accounts, and experimenting candidate features with these user accounts would likely not produce any results (e.g., would not change their behavior).

Using the label propagation technique, the partitioning module 206 may first label each of the nodes 402, 404, 406, 408, 410, 412, 414, 416, 418, 420, 422, 424, 426, and 428 with a unique label. The partitioning module 206 may then begin performing a first iteration of label propagation on the graph 400. For example, the partitioning module 206 may traverse the nodes in the graph 400 starting with a seed node (e.g., the node 402). When analyzing a node (e.g., the node 402), the partitioning module 206 may determine the neighboring nodes, and update the label of the node based on the label assigned to the highest number of neighboring node (or the neighboring node(s) having the strongest connections/edges). In this example, when the partitioning module 206 analyzes the node 402, the partitioning module 206 may determine that the node 402 has two neighboring nodes 404 and 406. Since the nodes 404 and 406 are assigned with different labels at this time, the partitioning module 206 may choose to update the label of the node 402 using the label of the node 404 since the edge between the nodes 404 and 402 is stronger (e.g., thicker) than the edge between the nodes 402 and 406. The partitioning module 206 may change the label of the node 402 using the label associated with the node 404, such that the nodes 402 and 404 have the same label after the update.

The partitioning module 206 may then analyze the node 404, and may update the label of the node 404 using the label of the node 402 (since the node 402 is the only neighboring node of the node 404). However, since they share the same label, no changes are made for the node 404. The partitioning module 206 may move on to the node 406, and may update the label of the node 406 with the label of the node 402 (since the node 402 is the only neighboring node of the node 406). Thus, the nodes 402, 404, and 406 share the same label after the updates.

The partitioning module 206 may then analyze the node 408. The partitioning module 206 may determine that the node 408 has neighboring nodes comprising the nodes 402, 418, 412, and 410. At this point, each of the nodes 402, 418, 412, and 410 has a different label. As such, the partitioning module 206 may choose to update the node 408 with the label assigned to the neighboring node 418 since the edge between the nodes 408 and 418 is stronger (e.g., thicker) than any of the edges between the node 408 and the other neighboring nodes. The partitioning module 206 may continue to perform the label propagation step by analyzing each of the nodes in the graph 400 one by one. When the partitioning module 206 has traversed all of the nodes in the graph 400, the first iteration of the label propagation step is completed.

In some embodiments, the partitioning module 206 may apply one or more constraints during each label propagation step. For example, the constraints may include a size limit for each community. Thus, when the number of nodes that have been assigned to a particular label has reached the size limit, the partitioning module 206 may freeze the nodes and the community, such that the nodes and the community will not participate in the subsequent iterations of label propagations. The constraints may also include a limit to a number of a particular type of users (e.g., first-time users) in each community. Thus, when the number of nodes corresponding to that particular type of users that have been assigned to a particular label has reached the number limit, the partitioning module 206 may freeze the nodes in the corresponding community, such that the nodes and the community will not participate in the subsequent iterations of label propagations.

The partitioning module 206 may stop iterating the label propagation step upon detection of a termination event. When the iterations of label propagation are completed, the partitioning module 206 may transform the graph 400 by combining nodes that are within the same community (e.g., assigned to the same label) into a single node. The edges between nodes within the same community would be removed, and the edges between nodes from two different communities will be retained and/or combined. The transformed graph is referred to a coarsened graph as the graph is now in a smaller scale (e.g., a smaller number of nodes and edges) than the original graph. The transformation of the graph completes an iteration of the coarsening process.

Figure 5A:
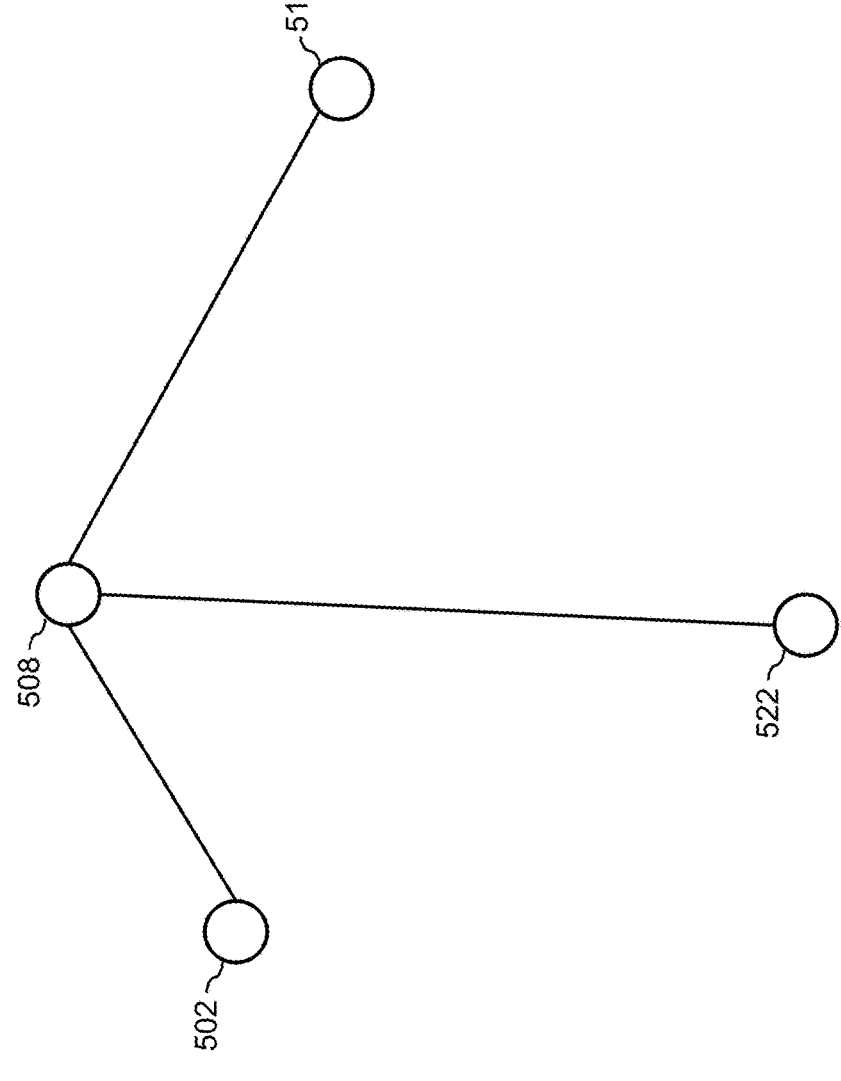
FIG. 5A illustrates an example coarsened graph according to an embodiment of the present disclosure.

FIG. 5A illustrates a coarsened graph 500 that has been transformed based on performing one or more iterations of the label propagation step on the graph 400. Based on the label assignment to the nodes, the partitioning module 206 may collapse the nodes 402, 404, and 406 into a node 502, may collapse the nodes 408, 418, 412, and 416 into a node 508, may collapse the nodes 410 and 414 into a node 514, and may collapse the nodes 420 and 422 into a node 522. The nodes 424, 426, and 428 from the graph 400 may be omitted due to the lack of connections with other nodes.

In some embodiments, the partitioning module 206 may repeat the coarsening process on the transformed graph 500. For example, the partitioning module 206 may again assign unique labels to each of the nodes 502, 508, 514, and 522 in the transformed graph 500, and may perform iterations of the label propagation step to propagate the labels in the nodes such that distinct communities can be formed based on the one or more constraints. Upon the occurrence of a termination event, the partitioning module 206 may again transform the graph 500 by collapsing the nodes (e.g., combining the nodes that are within the same community into a single node). In some embodiments, the partitioning module 206 may continue to coarsen the graph 500 until a threshold is met (e.g., the number of nodes in the transformed graph is below the threshold number, such as 10 million nodes, 1 million nodes, etc.). The partitioning module 206 may then perform partitioning based on the coarsened graph.

In some embodiments, the parameters used to coarsen the graph, such as the number iterations for performing the label propagation step, the number of iterations for performing the coarsening process, the constraints used for performing the coarsening process, etc., may be determined based on the estimated spill over effect of the graph 400 generated by the spillover estimation module 204. For example, the partitioning module 206 may determine to perform a higher number of iterations for performing the label propagation step and/or the coarsening process if the estimated spillover effect is at a higher level, and may determine to perform a lower number of iterations for performing the label propagation step and/or the coarsening process if the estimated spillover effect is at a lower level. In some embodiments, the partitioning module 206 may determine a more restricted constraint (e.g., a lower number of nodes within each community, a lower threshold of deviation among the distributions of a particular user types across multiple communities, etc.) when the estimated spillover effect is at a higher level.

In some embodiments, the partitioning module 206 may partition the coarsened graph (e.g., the coarsened graph 500, or another coarsened graph that has been coarsened from the coarsened graph 500, etc.) based on a size threshold determined for a particular group of users for the feature experimentation. For example, if it is determined that a particular group of users (e.g., the holdout group, the control group, the treatment group, etc.) for the feature experimentation comprises 2% of the entire user population, the partitioning module 206 may perform a 50-way partition on the coarsened graph, such that each partition may include nodes that represent approximately 2% (e.g., within a threshold deviation from 2%) of the entire user population.

In some embodiments, the partitioning module 206 may partition the coarsened graph based on one or more constraints. The constraints may be associated with a distribution of a particular type of users (e.g., users with a particular user attribute, such as first-time users, users of a certain age group, users with a certain tenure with the organization, average transaction frequency, uses with a certain conversion rate, etc.), such that the users in each partition are not different from each other by a threshold. In some embodiments, the partitioning module 206 may use a graph partitioning algorithm (e.g., METIS, Quicksort, etc.) to partition the coarsened graph based on the constraints.

Figure 5B:
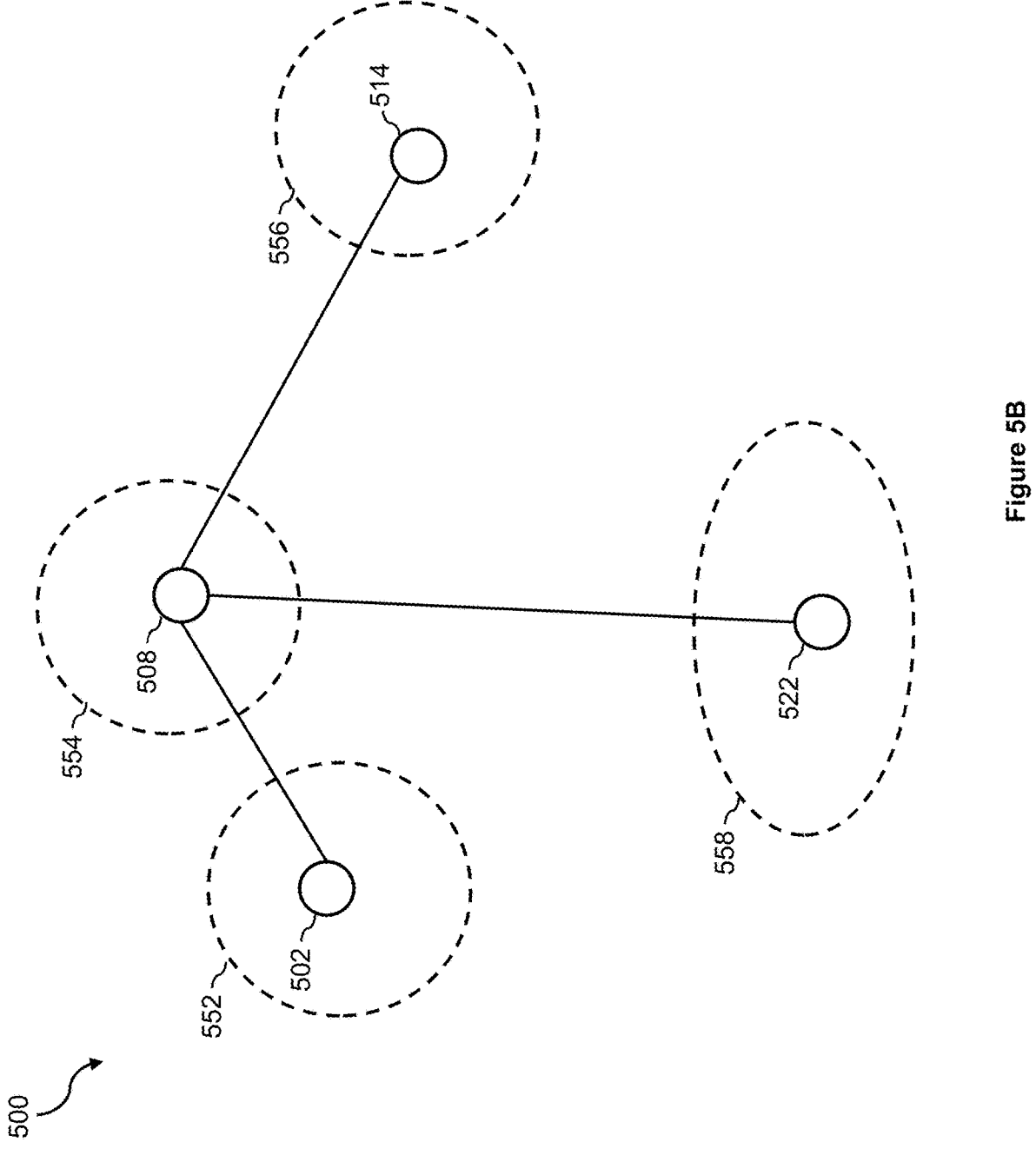
FIG. 5B illustrates an example partition of a coarsened graph according to an embodiment of the present disclosure.

FIG. 5B illustrates an example partitioning of the coarsened graph 500 according to various embodiments of the disclosure. As shown in FIG. 5B, the graph 500 has been partitioned into four partitions 552, 554, 556, and 558. Specifically, the partitioning module 206 has included the node 502 in the partition 552, has included the node 508 in the partition 554, has included the node 514 in the partition 556, and has included the node 552 in the partition 558. While each partition coincidentally includes exactly one node of the coarsened graph 500 in this example, in some embodiments, the partitioning module 206 may partition a coarsened graph by including multiple nodes in each partition, and each partition may or may not include the same number of nodes as long as they satisfy the pre-determined constraints.

Based on the one or more constraints, the partitions of the coarsened graph should be balanced. That is, the user distribution among the partitions should not deviate by more than a threshold according to the one or more constraints, such that each partition is more or less very similar with each other. In some embodiments, after partitioning the coarsened graph, the partitioning module 206 may then project the coarsened nodes to the nodes in the original graph, where each partition of nodes has a balanced size (each about 2% of the entire population) and balanced constraints.

Figure 6:
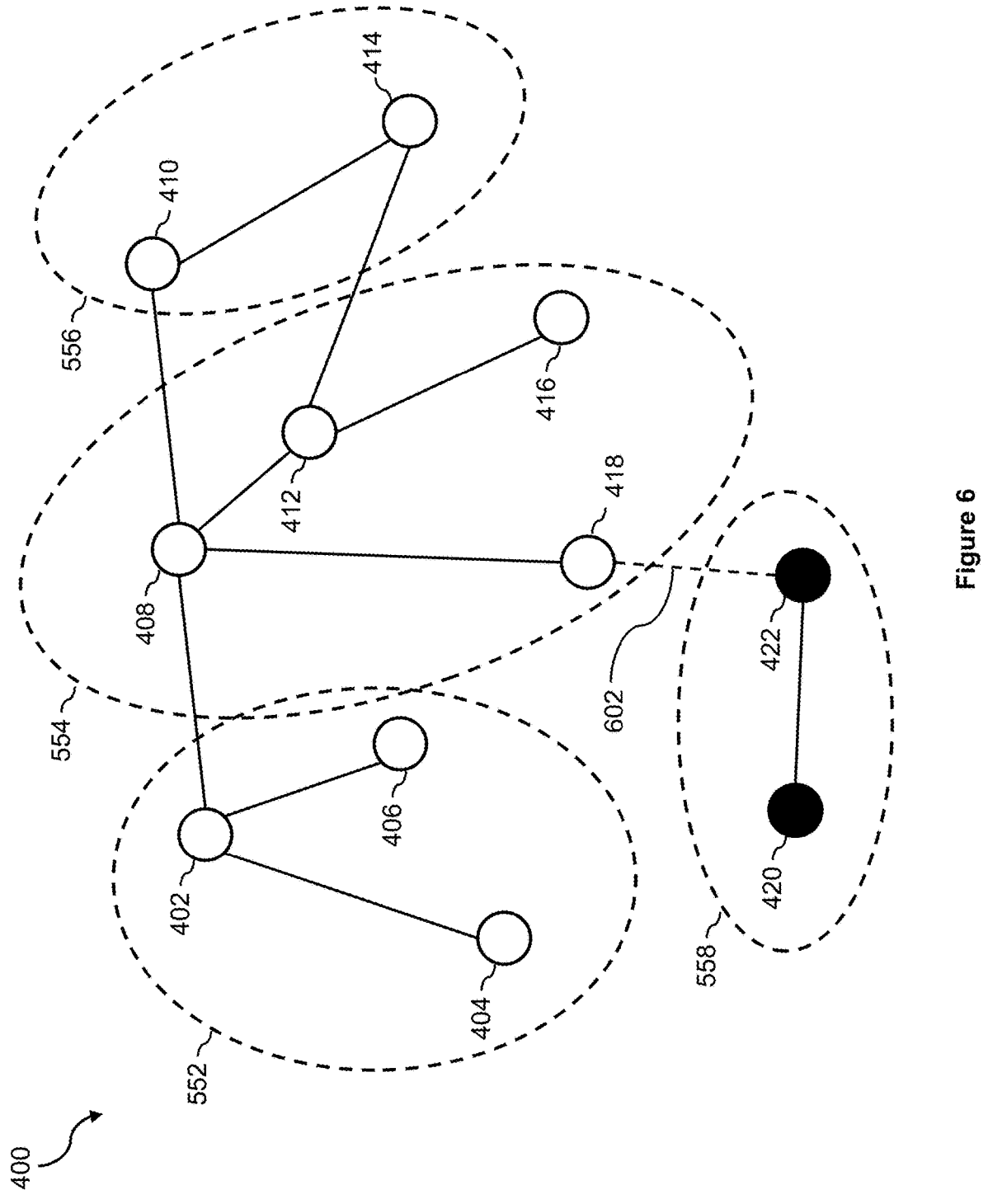
FIG. 6 illustrates an example partition of a graph based on a partitioned coarsened graph according to an embodiment of the present disclosure

FIG. 6 illustrates the projection of the coarsened and partitioned graph back to the original graph 400 according to various embodiments of the disclosure. For example, the partitioning module 206 may map each node in the coarsened graph to the one or more nodes in the original graph. For example, the partitioning module 206 may map the node 502 in the partition 552 back to the nodes 402, 404, and 406 in the original graph 400. The partitioning module 206 may also map the node 508 in the partition 554 back to the nodes 408, 412, 416, and 418 in the original graph 400. The partitioning module 206 may also map the node 514 in the partition 556 back to the nodes 410 and 414 in the original graph 400. The partitioning module 206 may also map the node 522 in the partition 558 back to the nodes 420 and 422 in the original graph 400.

In some embodiments, the partitioning module 206 may select one of the partitions, and assign the users (or user accounts) represented by the nodes in the selected partition to a particular group (e.g., the holdout group). In some embodiments, the partition module 206 may select a partition for the holdout group based on the connections (e.g., edges) among the partitions. For example, the partition module 206 may select a partition for the holdout group having the least number and/or the weakest edges with other partitions. In this example, the partitioning module 206 may select the partition 558, which encompasses nodes 420 and 422, as the holdout group. The partitioning module 206 may selection the partition 558 over other partitions because of the weak relationship (represented by the edge 602) between the partition 558 and the other partitions. The feature experimentation module 132 may not subject to the users (or user accounts) in the holdout group to any future experiments, such that the users in the holdout group can be the control group for subsequent experiments. In some embodiments, the partitioning module 206 may also select another partition, and assign the users (or user accounts) represented by the nodes in the partition to a treatment group for the feature experimentation. For example, the partitioning module 206 may select the partition 556, encompassing the nodes 410 and 414, as the treatment group.

The feature experimentation manager 202 may then perform the feature experiment with the users assigned to the treatment group (represented by the nodes 410 and 414). For example, the feature experimentation manager 202 may use the software modification module 210 to transmit updated programming code only to the instances of the computer software associated with the users in the treatment group. The updated programming code, when executed by the devices, may update the computer software to incorporate the candidate software feature (e.g., by modifying a user interface element, by adding/modifying/removing a functionality, etc.). In another example, the software modification module 210 may instruct the interface server 134 to provide a modified user interface (that has incorporated the candidate software feature) when the website is accessed by the users who are part of the treatment group.

The behavior tracking module 208 may then track behavior of the users in the treatment group and the users in the holdout group for a period of time (e.g., 4 weeks, 6 months, etc.) after the initiation of the feature experiment. For example, the behavior tracking module 208 may communicate with the user interface application 112 of the user device 110 and the user interface applications of other devices (e.g., the user devices 180 and 190, etc.) that belong to the users in the treatment group and the users in the holdout group/control group, and may pull (or otherwise obtain) interaction data associated with the user accessing and interacting with various user interfaces of the application and/or the website. The behavior tracking module 208 may compare the behavior of the users in the treatment group and the behavior of the users in the holdout group within the period of time, and may determine whether and an extent to which the candidate software feature induces an increase of positive behavior from the users. Based on the results of the feature experiment, the organization may determine whether to incorporate the candidate software feature into the computer software, for example, via a next software update of the computer software and/or whether to incorporate the candidate software feature into the website of the service provider server 130.

Figure 7:
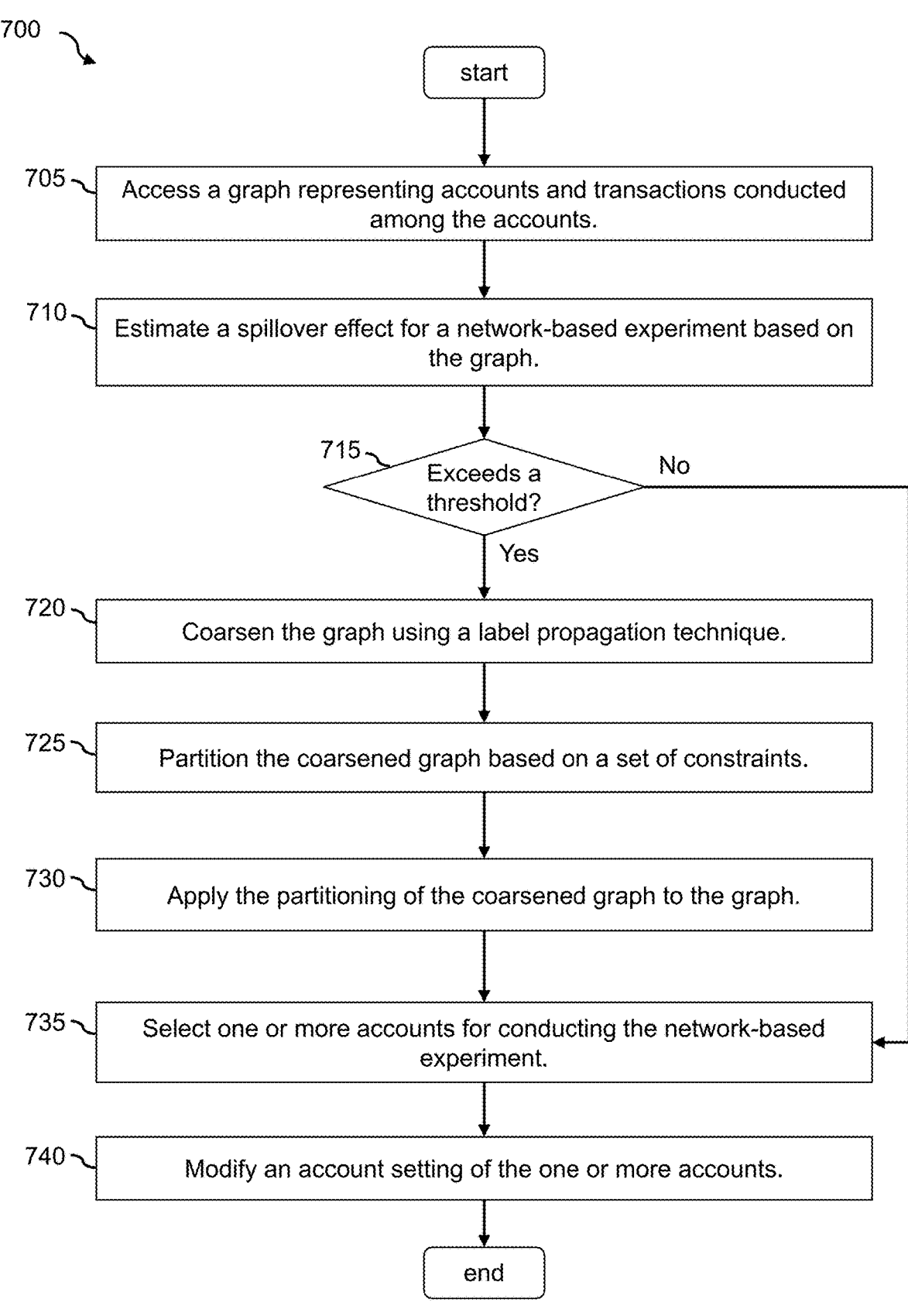
FIG. 7 illustrates an example a process for facilitating a software feature experiment according to an embodiment of the present disclosure.

FIG. 7 illustrates a process 700 for performing a computer software feature experiment according to various embodiments of the disclosure. In some embodiments, at least a portion of the process 700 may be performed by the feature experimentation module 132. The process 700 begins by accessing (at step 705) a graph representing accounts and transactions conducted among the accounts. For example, the feature experimentation module 132 may access the graph 270 that is generated using data from the account database 136. The process 700 then estimates (at step 710) a spillover effect for a network-based experiment based on the graph. For example, the feature experimentation manager 202 may use the spillover estimation module 204 to estimate a spillover effect if a feature experiment is performed on users of the service provider server 130 based on the graph 270. The spillover estimation module 204 may first randomly (or selectively) select users for the treatment group and the control group. Based on the connection between the selected users from the treatment group and the control group, the spillover estimation module 204 may estimate a spillover effect if a feature experiment is conducted based on the selected users.

The process 700 determines (at step 715) whether the estimated spillover effect exceeds a threshold. If the estimated spillover effect is below the threshold, the process 700 skips the steps 720-730 and directly selects (at step 735) one or more accounts for conducting the network-based experiment. For example, if it is determined that the estimated spillover effect is below the threshold, the feature experimentation manager 202 may determine that users of the service provider server 130 are not interconnected enough to enable the behavior of the control group to be affected by the behavior of the treatment group. Thus, the feature experimentation manager 202 may not need to perform additional steps to select users for the different experimentation groups in order to minimize the connections among the groups.

On the other hand, if the estimated spillover effect is above the threshold, the process 700 may proceed with performing the steps 720-730 to partition the graph for the selection of the users in different experimentation groups. Specifically, the process coarsens (at step 720) the graph using a label propagation technique. For example, the partitioning module 206 may coarsen the graph 270 across multiple levels. The partitioning module 206 may initially assign each node a unique label, and may iteratively updating a label of each node in the graph 270. The partitioning module 206 may then collapse nodes that have the same label, which completes one iteration of the coarsening process. The partitioning module 206 may continue to repeat the coarsening process on the coarsened graph iteratively. In some embodiments, the number iterations for performing the label propagation and/or the coarsening process may be determined based on the estimated spillover effect determined at the step 710. In some embodiments, the partitioning module 206 may perform the coarsening of the graph 270 using one or more constraints.

At step 725, the process 700 partitions the coarsened graph based on a set of constraints. For example, after completing the coarsening of the graph 270 (which may have been coarsened multiple times), the partitioning module 206 may partition the coarsened graph (e.g., the coarsened graph 500) into multiple partitions based on one or more constraints. The constraints may include a size of each partition, a range of distribution of a particular type of users (e.g., first-time users, inactive users, users having a certain length of tenure with the service provider server 130, etc.).

The process 700 then applies (at step 730) the partitioning of the coarsened graph to the graph and selects (at step 735) one or more accounts for conducting the network-based experiment. For example, the partitioning module 206 may map the nodes from the coarsened graph (e.g., the coarsened graph 500) back to the original graph (e.g., the graph 400). The partitioning module 206 may also select partitions from the graph for the various experimentation groups. The partitioning module 206 may select a first partition as the holdout group, and a second partition as the treatment group. The partitioning module 206 may then select the users (or the user accounts) corresponding to the nodes in the second partition as the treatment group. The software modification module 210 may modify the instances of the computer software associated with the users in the treatment group.

Figure 8:
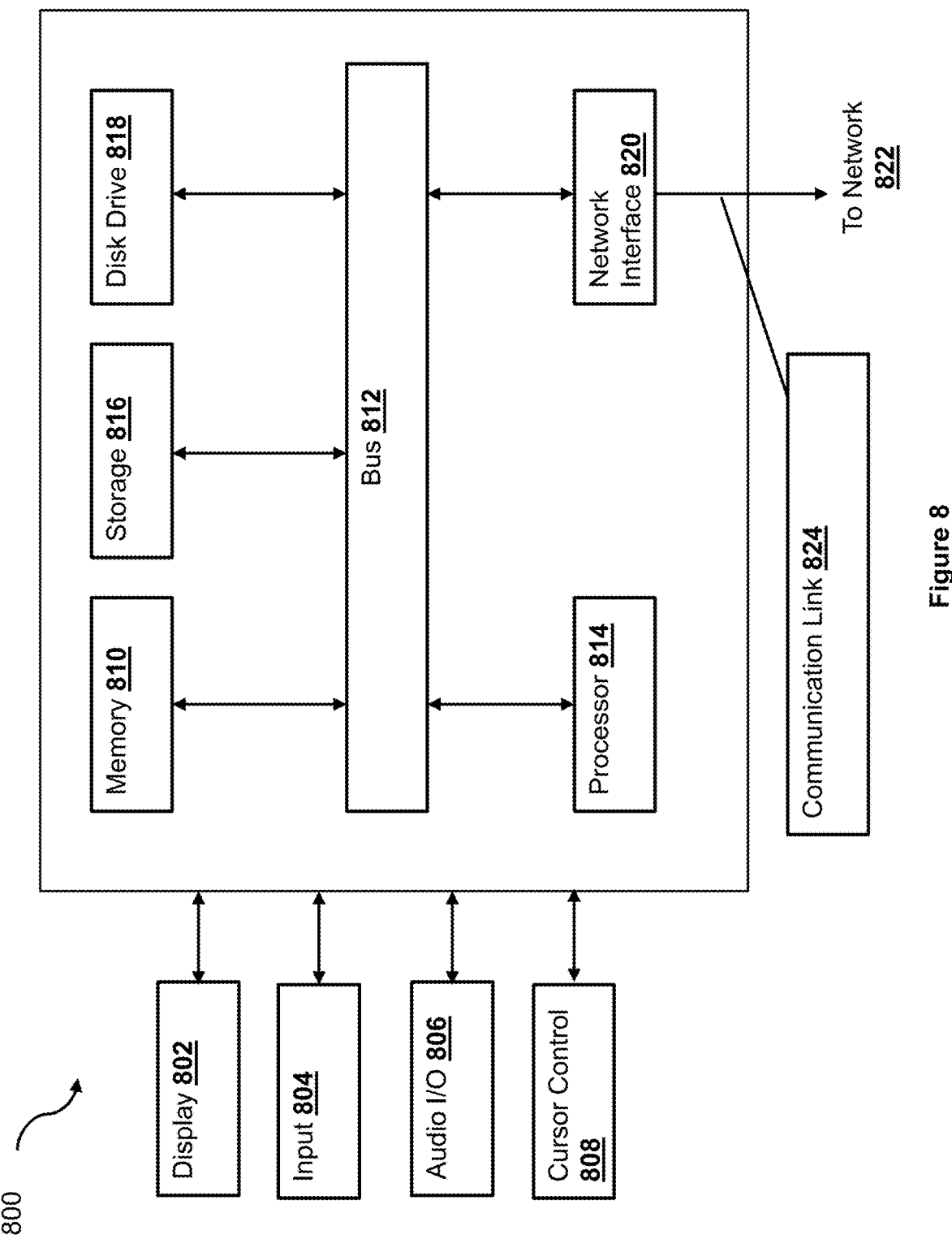
FIG. 8 is a block diagram of a system for implementing a device according to an embodiment of the present disclosure.

FIG. 8 is a block diagram of a computer system 800 suitable for implementing one or more embodiments of the present disclosure, including the service provider server 130 and the user devices 110, 170, 180, and 190. In various implementations, each of the user devices 110, 170, 180, and 190 may include a mobile cellular phone, personal computer (PC), laptop, wearable computing device, etc. adapted for wireless communication, and the service provider server 130 may include a network computing device, such as a server. Thus, it should be appreciated that the devices 110, 130, 170, 180, and 190 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account or a checkout page for purchasing an item from a merchant. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via a network 822. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid-state drive, a hard drive). The computer system 800 performs specific operations by the processor 814 and other components by executing one or more sequences of instructions contained in the system memory component 810. For example, the processor 814 can perform the computer software feature experimentation functionalities described herein, for example, according to the process 700.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
    accessing a graph comprising a plurality of nodes representing a plurality of accounts and a plurality of edges representing transactions conducted among the plurality of accounts;
    assigning a first label to a first node of the plurality of nodes in the graph;
    propagating the first label to a first subset of the plurality of nodes in the graph based on edge attributes of the plurality of edges in the graph;
    assigning a second label to a second node of the plurality of nodes in the graph;
    propagating the second label to a second subset of the plurality of nodes in the graph based on the edge attributes of the plurality of edges in the graph;
    coarsening the graph based on merging one or more nodes in the graph having a common label;
    partitioning the coarsened graph into two or more sub-graphs using one or more constraints;
    applying the partitioning of the coarsened graph to the graph based on mapping the two or more sub-graphs of the coarsened graph to a plurality of sub-graphs in the graph; and
    modifying an account setting of one or more of the plurality of accounts that are represented by a subset of nodes within a first sub-graph in the plurality of sub-graphs.

2. The system of claim 1, wherein the one or more constraints comprise a minimum size threshold for a first one of the two or more sub-graphs and/or a maximum size threshold for the first one of the two or more sub-graphs.

3. The system of claim 1, wherein the modifying the account setting comprises modifying a presentation of a user interface element on a user interface when the user interface is accessed through one of the one or more accounts.

4. The system of claim 1, wherein the modifying the account setting comprises including an additional transaction functionality for the one or more accounts.

5. The system of claim 1, wherein the operations further comprise:
    merging the first node and a third node that has been assigned the first label.

6. A method comprising:
    accessing, by a computer system, a graph representing a plurality of users with a service provider and transactions conducted among the plurality of users;
    transforming, by the computer system, the graph based on iteratively performing a coarsening process on the graph;
    partitioning, by the computer system, the transformed graph into two or more sub-graphs based on one or more constraints;
    selecting, from the plurality of users, a first subset of users based on the partitioning of the transformed graph;
    performing a feature experiment for the service provider, wherein the performing the feature experiment comprises modifying first instances of a computer software associated with the first subset of users;
    subsequent to the modifying the first instances of the computer software, monitoring first interactions of the first subset of users with the first instances of the computer software and second interactions of a second subset of users with second instances of the computer software;
    comparing the first interactions against the second interactions; and
    updating the computer software based on the comparing.

7. The method of claim 6, wherein the feature experiment is performed without modifying the second instances of the computer software associated with the second subset of users.

8. The method of claim 6, wherein the transforming the graph comprises:
    generating a first coarsened graph based on collapsing one or more first subsets of nodes in the graph into one or more first nodes; and
    generating a second coarsened graph based on collapsing one or more second subsets of nodes in the first coarsened graph into one or more second nodes.

9. The method of claim 6, wherein the modifying the first instances of the computer software comprises modifying a user interface element of a user interface in the first instances of the computer software.

10. The method of claim 6, wherein the modifying the first instances of the computer software comprises adding a functionality to the first instances of the computer software, wherein the functionality is unavailable to the second instances of the computer software associated with the second subset of users.

11. A non-transitory machine-readable medium having stored thereon machine-readable instructions executable to cause a machine to perform operations comprising:
    accessing a graph comprising a plurality of nodes representing a plurality of users with a service provider and a plurality of edges representing relationships among the plurality of users;
    estimating a spillover effect for performing a feature experiment on the plurality of users based on the graph;
    determining one or more constraint parameters based on the estimated spillover effect;

assigning labels to the plurality of nodes in the graph;

propagating the labels through the plurality of nodes in the graph using a label propagation technique;

generating a coarsened graph from the graph based on merging one or more nodes in the graph that share an identical label;

partitioning the coarsened graph into two or more sub-graphs using the one or more constraint parameters;

selecting, from the plurality of users, a first subset of users based on the partitioning of the coarsened graph; and performing the feature experiment on the plurality of users, wherein the performing the feature experiment comprises modifying first instances of a computer software associated with the first subset of users.

12. The non-transitory machine-readable medium of claim 11, wherein the one or more constraint parameters comprise a distribution deviation parameter that specifies a threshold deviation for a distribution of a particular type of users among the two or more sub-graphs.

13. The non-transitory machine-readable medium of claim 11, wherein the one or more constraint parameters comprise a distribution deviation parameter that specifies a threshold deviation for a conversion rate among the two or more sub-graphs.

14. The non-transitory machine-readable medium of claim 11, wherein the modifying the first instances of the computer software comprises modifying a user interface element of a user interface in the first instances of the computer software.

15. The non-transitory machine-readable medium of claim 11, wherein the modifying the first instances of the computer software comprises adding a functionality to the first instances of the computer software, wherein the functionality is unavailable to second instances of the computer software associated with a second subset of users from the plurality of users.

16. The non-transitory machine-readable medium of claim 11, wherein the operations further comprise:

assigning a first label to a first node in the graph; and propagating the first label to a first subset of the plurality of nodes in the graph based on edge attributes of the plurality of edges.

17. The system of claim 1, wherein the operations further comprise:

modifying first instances of a computer software associated with the one or more accounts.

18. The system of claim 17, wherein the one or more accounts are one or more first accounts, wherein the operations further comprise:

monitoring first interactions of the first set of users associated with the one or more first accounts with the first instances of the computer software and second interactions of a second set of users with second instances of the computer software;

comparing the first interactions against the second interactions; and determining whether to update the computer software based on the comparing.

19. The method of claim 6, wherein the transforming the graph comprises:

assigning a first label to a first node in the graph; and propagating the first label to a first plurality of other nodes in the graph based on edge attributes of a plurality of edges in the graph.

20. The method of claim 19, wherein the transforming the graph further comprises:

assigning a second label to a second node in the graph; and propagating the second label to a second plurality of other nodes in the graph based on the edge attributes of the plurality of edges in the graph.

* * * * *